United States Patent Office 3,597,496
Patented Aug. 3, 1971

3,597,496
PREPARATION OF CROSS-LINKED ACRYLONITRILE POLYMERS
Roland Dagon and Camille Nordmann, Fribourg, Switzerland, assignors to Lonza Ltd., Gampel, Valais, Switzerland
No Drawing. Filed May 24, 1968, Ser. No. 731,701
Claims priority, application Switzerland, May 25, 1967, 7,378/67
Int. Cl. C08f 27/18; C08g 37/32
U.S. Cl. 260—851                 7 Claims

ABSTRACT OF THE DISCLOSURE

Cross-linked spinnable homopolymers and copolymers of acrylonitrile containing at least 80 percent by weight acrylonitrile and the balance being unsaturated copolymerizable monomers, are prepared by polymerization with a small amount of a cross-linking agent containing an aldehyde group in a reaction medium of nitric acid containing at least 50 percent $HNO_3$.

---

The invention relates to the preparation of cross-linked acrylonitrile polymers.

It is known to obtain polymer solutions containing at least 80 percent of acrylonitrile units, by polymerization in nitric acid of a concentration maintaining the formed polymer in solution.

It is further known to polymerize acrylonitrile alone or in mixture with other copolymerizable monomers in the presence of cross-linking agents which contain several double bonds; such agents are e.g. N,N'-methylene bis acrylamide and triacrylo hexahydro-s-triazine. Such process requires the preceding preparation of the cross-linking agent, and this preparation is difficult due to the exothermicity of the reaction.

Finally, it is known to cross-link polymers by treating polyacrylonitrile fibers with formaldehyde or substances generating formaldehyde in the presence of acid or basic catalyst, thereby increasing the resistance of the fibers to shrinking.

We have found that cross-linked polymers on polyacrylonitrile basis are obtained when the polymerization in concentrated nitric acid is carried out in the presence of compounds containing an aldehyde group. The polyacrylonitrile undergoes practically no hydrolytic degradation of the nitrile group and can be readily formed to shaped articles such as filaments and fibers having improved mechanical properties, particularly improved loop tenacity.

In addition to the improvement of the mechanical properties of the thus prepared shaped articles like fibers and filaments, the thus prepared products present a high molecular weight of the polyacrylonitrile. This is all the more surprising as the aldehydes are known to decrease the molecular weight. Also in view of the well known sensitivity of aldehydes to oxidizing agents, it was quite unexpected to produce the recited effects in a concentrated nitric acid medium.

The polymers produced in accordance with the invention contain at least 80 percent by weight of acrylonitrile; the balance may be other unsaturated nitriles such as methacrylonitrile or vinylidene cyanide; vinyl compounds such as styrene, and their sulfonic acids such as vinyl sulfonic acid; vinyl pyridine; acrylic and methacrylic acid and the esters and amides thereof; also allyl compounds such as allyl and methallyl sulfonic acids.

The term "substances containing aldehyde groups," as used herein, comprises substances containing one or more aldehyde groups such as formaldehyde, acetaldehyde, benzaldehyde, glyoxal, chloral, or substances which can liberate one or more aldehyde groups, such as trioxane, paraldehyde, or substances which can react like aldehydes such as acetals and urea-formaldehyde resins.

Preferably, 0.01 to 2 percent by weight, calculated on the monomer, of the aldehyde groups containing substance are employed as additive in the polymerization. The polymerization is carried out in a nitric acid of a concentration sufficient to dissolve the polymer. Said concentration is at least 50%, preferably 50 to 68 percent.

If a polymer with substantially intact nitrile groups is to be obtained, the polymerization temperature should be below 30° C., preferably in the range of +20 to —10° C.

Numerous accelerators are available to adjust the rate of polymerization. Such activators are organic and inorganic azo compounds such as 2,2'-azobis-(isobutyronitrile), 2,2' - azobis-(2,4-dimethylvaleronitrile), azodisulfonic acid; peracids such as peracetic acid, perbenzoic acid, peroxymonosulfuric acid (Caro's acid), peroxydisulfuric acid, peroxynitric acid; hydrogen peroxide; organic peroxides such as benzoyl peroxide, acetyl peroxide; perborates, and others.

Catalytically active redox systems can be formed by adding to said solvent nitric acid or said oxidizing agents small amounts of readily oxidizable substances such as alkali bisulfites; sulfinic acids such as formamidine sulfinic acid and benzenesulfinic acid; ascorbic acid, and substances having similar effects.

Traces of certain metals such as iron, copper, titanium, silver, uranium, and vanadium, activate the polymerization catalyst.

The rate of polymerization can also be increased by ultraviolet irradition. The term "catalytic system," as used herein, includes such ultraviolet irradiation.

The acrylonitrile can be polymerized also in the presence of a catalytic system which contains percompounds, i.e. compounds containing an atom at a higher oxidation state, as well as a metal derivative of an organic compound containing at least two carbonyl groups. Thereby, we obtain a substantially non-hydrolyzed polymer in a yield exceeding 96% whereby the monomers are substantially undegraded, the polymerization time is relatively short, and the polymerization temperature relatively low. In addition, the course of reaction can be influenced.

Suitable percompounds are, e.g., peroxydisulfuric acid and its alkali metal salts, peroxymonosulfuric (Caro's acid). They are employed in an amount of 0.0001 to 0.02 moles per mole of acrylonitrile.

Metal derivatives of organic compounds, which contain at least two carbonyl groups and are suitable for the catalyst system of the invention, are e.g. those of copper, iron, silver, uranium, and vanadium. The organic compound, which contain at least two carbonyl groups is preferably a compound where one of the carbonyl groups is capable of enolization; such compounds are e.g. acetyl acetone, benzoyl acetone, acetyl acetanilide, dibenzoyl methane, barbituric acid, resorcinol, and phloroglucine.

The metal derivatives of the organic compound or compounds with at least two carbonyl groups can be added as such to the reaction mixture or can be formed in situ. It is suspected that these metal derivatives of organic compounds with at least two carbonyl groups possess activation characteristics, because during addition of these derivatives to the reaction mixture the initial activation period of the polymerization is shortened. Otherwise it is possible, thanks to these derivatives, to influence the molecular weight of the polymerizate and the course of the polymerization, especially whenever the derivative in question is formed in situ with an excess of the metal or of the compound or compounds with at least two carbonyl groups.

Advantageously a quantity of these derivatives of between 0.00001 and 0.02 mole per mole of acrylonitrile monomer is used. During formation in situ of the above mentioned metal derivatives of the metal compound or compounds with at least two carbonyl groups it will be of advantage to introduce to the reaction mixture, on the one hand, a quantity of between 0.00001 and 0.02 mole of the compound or compounds with at least two carbonyl groups and simultaneously a quantity of between 0.00001 and 0.02 equivalent gram of metal salt per mole of acrylonitrile monomer.

The polymerization is carried out in the classical manner preferably in a closed container with agitator or circulator, which container has been provided with cooling and heating devices. It is advantageous to flush out the reaction vessel prior to the reaction with the help of an inert gas. The reaction can be carried out continuously or discontinuously at a low, equal to or higher than atmospheric pressure. The monomers are introduced preferably in such quantities that the polymerizate solution obtained can be formed directly, for example, to fibers. Generally speaking, the quantity of monomers is dosed in such a manner that one will obtain a solution of 5 to 30% polymerizate. The monomer or monomers can be introduced all at once or gradually.

It is also possible to change the concentration of nitric acid in the course of the polymerization through addition of concentrated or diluted acid.

It is also possible, if need be, to remove nitric oxides present, for example through degassing in the vacuum or through addition of small quantities of urea.

It is suspected that the aldehyde groups of the substances mentioned by way of example and introduced as such or liberated by the nitric acid react with a part of the acrylonitrile, forming compounds which contain two or more double bonds, which on their part are capable of copolymerizing and of cross-linking the polymerizate which is forming or has been formed. It is also possible that the aldehyde groups in the presence of nitric acid react with the nitrile groups while forming polymers.

The polymerization takes place in accordance with the statements of Swiss Pat. No. 418,517.

The following examples will explain the invention without limiting it in any way.

EXAMPLE 1

In a 0.5-liter flask, provided with an agitator and submerged in a bath, whose temperature is kept at 0° C., the following mixture, produced at 0° C., is introduced:

|  | G. |
|---|---|
| 60% nitric acid | 425 |
| $Fe(NO_3)_3 \cdot 9H_2O$ | 0.075 |
| Formaldehyde | x |
| Acrylonitrile | 75 |
| Ammonium peroxydisulfate | 3 |

0.5 ml. acetyl actone.

The polymerization is carried out at about 0° C. in a nitrogen atmosphere. After 22 hours of reaction, a clear and viscous solution will be obtained which is suitable for spinning.

In order to determine the molecular weight of the polymerizate obtained, a sample is taken from the solution, which is diluted with nitric acid and to which sufficient water is added while stirring briskly, in order to precipitate the polymerizate formed. The precipitate is then filtered, washed and dried, it is then dissolved again in 58% nitric acid at a ratio of 0.5 g. for 100 ml. solution. The flow time of this solution, namely $t_p$, as well as the flow time of the solvent, namely $t_s$, are determined viscosimetrically at 30° C. The specific viscosiy is calculated $$\eta_{sp} = \frac{t_p}{t_s} - 1$$

which is introduced to the formula $M \cdot \eta_{sp}/c \cdot K$ (see for example Swiss Pat. 266,375), in which formula M represents the molecular weight, c the concentration in moles of monomers per liter of solution and K a constant equaling $1.5 \cdot 10^{-4}$.

In the succeeding table the molecular weights are presented which were determined as a function of the quantity of formaldehyde added to the polymerizate mixture. By way of comparison, the molecular weight is given for an experiment without formaldehyde.

| Quantity of added formaldehyde in Grams: | Molecular weight |
|---|---|
| 0 | 53.900 |
| 0.04 | 58.600 |
| 0.08 | 62.300 |
| 0.16 | 80.500 |
| 0.24 | 100.000 |

The surprising effect of formaldehyde on the molecular weight of the polymerizate obtained was found.

EXAMPLE 2

In a container made of stainless steel and provided with a cooling arrangement, a stirring device and a thermometer, the following are introduced:

|  | G. |
|---|---|
| 60% nitric acid | 2800 |
| Acrylonitrile | 495 |
| Ammonium peroxydisulfate | 15 |
| $Fe(NO_3)_3 \cdot 9H_2O$ | 0.45 |
| Urea-formaldehyde resin (designated subsequently by HF) | Y |

3.27 ml. acetyl acetone.

The urea-formaldehyde resin, which in itself is not the object of the invention, is obtained by a classical method (for example according to Houben-Weyl, "Methods of Organic Chemistry," 4th ed., vol. 14/2, p. 348).

The polymerization takes its course at about 0° C. After 24 hours of reaction time, a clear and viscous solution will be obtained. The viscosity of the solution obtained is measured at 0° C. by way of the falling ball test. The molecular weight of the polymerizate obtained is likewise determined in the same manner as in Example 1. The results of these measurements, expressed as a function of the introduced quantity of HF resin in gram per hundred gram of acrylonitrile, have been summarized in the following table:

| Quantity of Resin HF | Molecular weight | Viscosity in poises |
|---|---|---|
| 0.00 | 49.500 | 510 |
| 0.05 | 53.000 | 750 |
| 0.2 | 62.900 | 1,580 |
| 0.3 | 77.700 | 2,600 |
| 0.4 | 104.500 | 4,860 |
| 0.5 | 114.000 | 7,430 |

It was found that both the molecular weight and the viscosity of the solution obtained increase in dependence on the quantity of added resin. Although the viscosity of the solution will reach very high values, no gelling was observed.

EXAMPLE 3

The following mixture is polymerized under the same conditions as in Example 2:

|  | G. |
|---|---|
| 60% nitric acid | 1870 |
| Acrylonitrile | 303 |
| Methylacrylate | 25 |
| Sodium-methallyl sulfonate | 3.3 |
| Ammonium peroxydisulfate | 10 |
| $Fe(NO_3)_3 \cdot 9H_2O$ | 0.28 |
| HF resin (obtained according to Example 2) | z |

2.18 ml. acetyl acetone.

The molecular weights of the copolymers obtained and the viscosities of the polymerization solutions have been summarized in the following table as a function of the quantity of the added HF resin:

| Quantity of HF resin | Molecular weight | Viscosity in poises |
|---|---|---|
| 0 | 51,600 | 500 |
| 0.2 | 59,000 | 930 |
| 0.4 | 67,200 | 1,540 |
| 0.6 | 88,400 | 5,920 |

EXAMPLE 4

The results given in the succeeding table were obtained under the same conditions as in Example 2, but with substitution of 0.1% aldehyde for the HF resin, calculated on the weight of the acrylonitrile:

| Aldehyde: | Molecular weight |
|---|---|
| None | 54.000 |
| Formaldehyde | 82.000 |
| Acetaldehyde | 87.000 |
| Propionaldehyde | 77.000 |
| n-Butyraldehyde | 59.000 |
| Capric aldehyde | 62.900 |
| Lauryl aldehyde | 62.900 |
| Benzaldehyde | 63.000 |
| 2-quinolinaldehyde | 67.900 |
| Chloral | 58.000 |

EXAMPLE 5

The following mixture is polymerized under the same operating conditions as in Example 2:

|  | G. |
|---|---|
| 60% nitric acid | 2800 |
| Acrylonitrile | 495 |
| Ammonium peroxydisulfate | 15 |
| $Fe(NO_3)_3 \cdot 9H_2O$ | 0.45 |

3.27 ml. acetyl acetone.

to which are added, prior to the reaction, the quantities of aldehyde stated in the following table, expressed in percent, calculated on the weight of acrylonitrile. After a 24-hour reaction time at approximately 0° C., a homogeneous and viscous solution is obtained, which is degasified under reduced pressure and spun in the customary manner, for example according to the directions in Swiss Pat. 348,776. After their formation, the fibers are washed, stretched in hot water and dried.

| Aldehyde added | Strength in gram denier | | | |
|---|---|---|---|---|
| | Thread | | | |
| | Dry | Wet | Loops | Knots |
| None (test experiment) | 3.5 | 2.6 | 1.0 | 1.4 |
| 0.1% propionaldehyde | 3.6 | 2.8 | 1.2 | 1.8 |
| 0.1% glutaraldehyde | 3.6 | 2.7 | 1.5 | 2.1 |
| 0.1% chloral | 4.0 | 3.3 | 2.0 | 2.5 |
| 0.1% 2-quinolinaldehyde | 2.8 | | 1.4 | 2.1 |

The improvement of the loop and knot tenacities on the basis of the addition of aldehyde is obvious.

EXAMPLE 6

The following mixture is polymerized under the same conditions as in Example 2:

|  | G. |
|---|---|
| 60% nitric acid | 1870 |
| Acrylonitrile | 303 |
| Methylacrylate | 25 |
| Sodium-methallyl sulfonate | 3.3 |
| Ammonium peroxydisulfate | 10 |
| $Fe(NO_3)_3 \cdot 9H_2O$ | 0.28 |

2.18 ml. acetyl actone.

to which are added, prior to polymerization, the quantities of aldehyde, expressed in weight percent of the monomers and given in the following table. After 24 hours of reaction at 0°, a homogeneous and viscous solution is obtained, which is spun as in Example 5.

| Aldehyde added | Strength in gram denier | | | |
|---|---|---|---|---|
| | Thread | | | |
| | Dry | Wet | Loops | Knots |
| None (test experiment) | 3.0 | 1.8 | 0.8 | 1.2 |
| 0.1% glutaraldehyde | 3.8 | 3.5 | 1.2 | 1.6 |
| 0.1% capric aldehyde | 3.8 | 3.8 | 1.1 | 2.0 |

Here too the effect of the aldehyde insofar as improvement of the tensile strength of the thread, the loop and the knot tenacity, are concerned, is remarkable.

What is claimed is:

1. A process for the production of spinnable solutions of acrylonitrile polymers cross-linked with a compound containing an aldehyde group, said polymers being selected from the group consisting of acrylonitrile homopolymers and copolymers containing at least 80 percent of acrylonitrile units and the balance being ethylenically unsaturated monomers copolymerizable with acrylonitrile, said process comprising polymerizing the monomeric material with from 0.01 to 2 percent by weight based on said monomeric material of a cross-linking compound containing an aldehyde group, said polymerization being conducted in a reaction medium of nitric acid having a concentration of at least 50 percent by weight $HNO_3$ at a temperature of below 30° C. and in presence of a catalytic system.

2. The process according to claim 1 wherein the reaction temperature is from −10° to +20° C.

3. The process according to claim 1 wherein the unsaturated copolymerizable monomer is selected from the group consisting of unsaturated nitrile vinyl compounds, allyl compounds, acrylic acid, methacrylic acid and esters and amides of said acids.

4. The process according to claim 1 wherein the nitric acid contains from about 50 percent to 68 percent by weight $HNO_3$.

5. The process according to claim 1 wherein the polymerization is carried out until a clear viscous solution is obtained.

6. The process according to claim 5 wherein the polymerization is carried out for a time up to about 24 hours.

7. A cross-linked spinnable polymer obtained according to the process of claim 1.

References Cited

UNITED STATES PATENTS

| 2,679,494 | 5/1954 | Thomas | 260—73 |
| 2,688,608 | 9/1954 | Weinstock | 260—73 |
| 2,946,760 | 7/1960 | DeWitt et al. | 260—73 |
| 2,982,753 | 5/1961 | Holmes et al. | 260—29.6Ai |
| 3,213,069 | 10/1965 | Rausch | 260—85.5N |
| 3,410,941 | 11/1968 | Dagon et al. | 260—29.6Ai |

FOREIGN PATENTS

| 1,017,046 | 1/1966 | Great Britain | 260—29.6Ai |

JOHN C. BLEUTGE, Primary Examiner

U.S. Cl. X.R.

260—29.4, 29.6, 73, 85.5, 88.7